US006317873B1

(12) United States Patent
Townsend (10) Patent No.: US 6,317,873 B1
(45) Date of Patent: Nov. 13, 2001

(54) ASSEMBLY LANGUAGE TRANSLATOR

(75) Inventor: Arthur R. Townsend, Plano, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/173,158

(22) Filed: Oct. 14, 1998

(51) Int. Cl.[7] ........................................................ G06F 9/45
(52) U.S. Cl. ........................................ 717/7; 717/5; 717/8
(58) Field of Search ...................... 717/5, 7, 10; 707/523

(56) References Cited

U.S. PATENT DOCUMENTS

| 4,656,582 | * | 4/1987 | Chaitin et al. | 717/7 |
|---|---|---|---|---|
| 5,274,818 | * | 12/1993 | Vasilevsky et al. | 717/5 |
| 5,287,490 | * | 2/1994 | Sites | 717/5 |
| 5,307,492 | * | 4/1994 | Bensen | 717/7 |
| 5,414,855 | * | 5/1995 | West | 717/8 |
| 5,724,590 | * | 3/1998 | Goettelmann et al. | 717/7 |
| 5,768,564 | * | 6/1998 | Andrews et al. | 717/5 |
| 5,805,893 | * | 9/1998 | Sproul et al. | 717/5 |
| 5,815,719 | * | 9/1998 | Goebel | 717/7 |
| 5,920,720 | * | 7/1999 | Toutonghi et al. | 717/5 |
| 5,933,641 | * | 8/1999 | Ma | 717/5 |
| 6,002,874 | * | 12/1999 | Bahrs et al. | 717/5 |
| 6,014,517 | * | 1/2000 | Shagam et al. | 717/5 |
| 6,023,583 | * | 2/2000 | Honda | 717/9 |
| 6,071,317 | * | 6/2000 | Nagel | 717/4 |

OTHER PUBLICATIONS

Wendt, "Fast code geneartion using automtically generated decision tree", ACM SIGPLAN, pp 9–15, Jun. 1990.*
Morrisett et al., "From system F to typed assembly language", ACM POPL, pp 85–97, Mar. 1998.*
Benitez et al, "A portable global optimizer and linker", ACM SIGPLAN, pp 329–338, Jun. 1988.*
Proebsting et al, "Optimizing an ANSI C interpreter with superoperators", ACM POLP, pp 322–332, Jan. 1995.*

* cited by examiner

Primary Examiner—Kakali Chaki
Assistant Examiner—Anil Khatri
(74) Attorney, Agent, or Firm—Baker Botts L.L.P.

(57) ABSTRACT

A computer-implemented method of translating an assembler program into a high-level language computer program is provided. The method includes receiving each line of the assembler program, parsing individual fields in each assembler program line, including an absolute line number and an opcode for an assembler instruction. Each assembler program line is then stored into a data structure such that each line is accessible and each field in each line is accessible, and the numeric opcode of each assembler program line is parsed into individual digits. Alternatively, the symbolic opcode and operands may be decoded to produce a more human readable and maintainable output. For each assembler program line, a decision tree is traversed in response to the value of each opcode digit to identify the corresponding assembler instruction. The assembler instruction is then translated to an equivalent set of code in the high-level computer language. The equivalent set of code for each assembler program line is generated and provided as output.

40 Claims, 3 Drawing Sheets

ASSEMBLY LANGUAGE TRANSLATOR

TECHNICAL FIELD OF THE INVENTION

This invention is related in general to the field of computer applications. More particularly, the invention is related to a translator and method therefor for translating from a computer program in assembly language to a computer program in a high-level language, such as C.

BACKGROUND OF THE INVENTION

Computers can be programmed by applications written in many different types of computer languages. The earlier computer applications were typically written in assembly language, such as Z8000. More recently, the preference in programming languages is high-level languages such as C and C++, which are easier to understand, code, and debug because of their closer resemblance to English. Further, these high-level languages often possess other advantages such as portability to different computing platforms. Because a large volume of complex application programs deployed in many industries is already written in assembly languages, manually rewriting these programs in high-level languages would be extremely costly. Therefore, a more cost effective way to recode these application programs in high-level languages is desired.

SUMMARY OF THE INVENTION

Accordingly, there is a need for a translator that is capable of translating a program written in an assembly language to a high-level language such as C.

In accordance with the present invention, an assembly language to a high-level language translator is provided which eliminates or substantially reduces the disadvantages associated with prior systems and methods.

In one aspect of the invention, a computer-implemented method of translating an assembler program into a high-level language computer program is provided. The method includes receiving each line of the assembler program, parsing individual fields in each assembler program line, including an absolute line number and an opcode for an assembler instruction. Each assembler program line is then stored into a data structure such that each line is accessible and each field in each line is accessible, and the opcode of each assembler program line is parsed into individual digits. For each assembler program line, a decision tree is traversed in response to the value of each opcode digit to identify the corresponding assembler instruction. The assembler instruction is then translated to an equivalent set of code in the high-level computer language. The equivalent set of code for each assembler program line is generated and provided as output.

BRIEF DESCRIPTION OF THE DRAWINGS

For a better understanding of the present invention, reference may be made to the accompanying drawings, in which.

DETAILED DESCRIPTION OF THE INVENTION

The preferred embodiments of the present invention are illustrated in FIGS. 1–6, like reference numerals being used to refer to like and corresponding parts of the various drawings.

Figure 1:
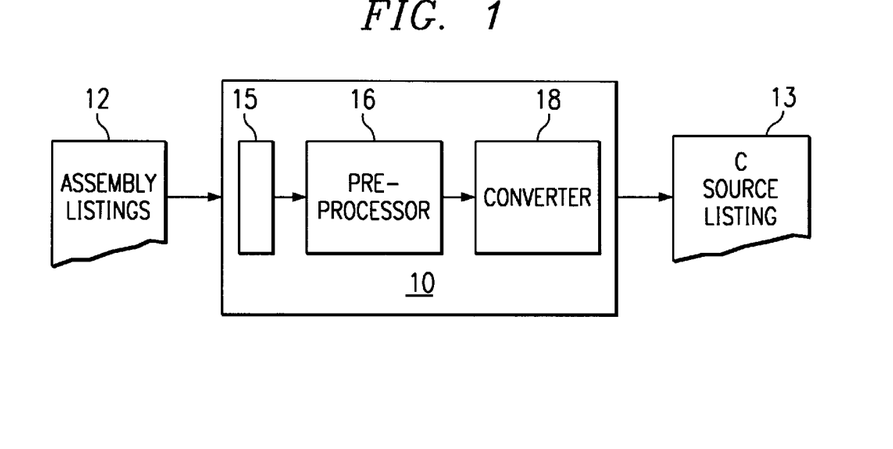
FIG. 1 is a top level block diagram of an embodiment of the translator of the present invention.

FIG. 1 is a simplified block diagram of a translator 10 operable to translate an origination computer source listing 12 in an assembly language, such as Z8000, to target high-level language intermediate source listings 13. Translator 10 may include a process 15 for address resolution, a preprocessor 16, and a converter 18. In an embodiment of the present invention, the target language for source listings 13 is C and languages like C. However, the translator and method therefor of the present invention are applicable to translation to other high-level languages.

Figure 2:
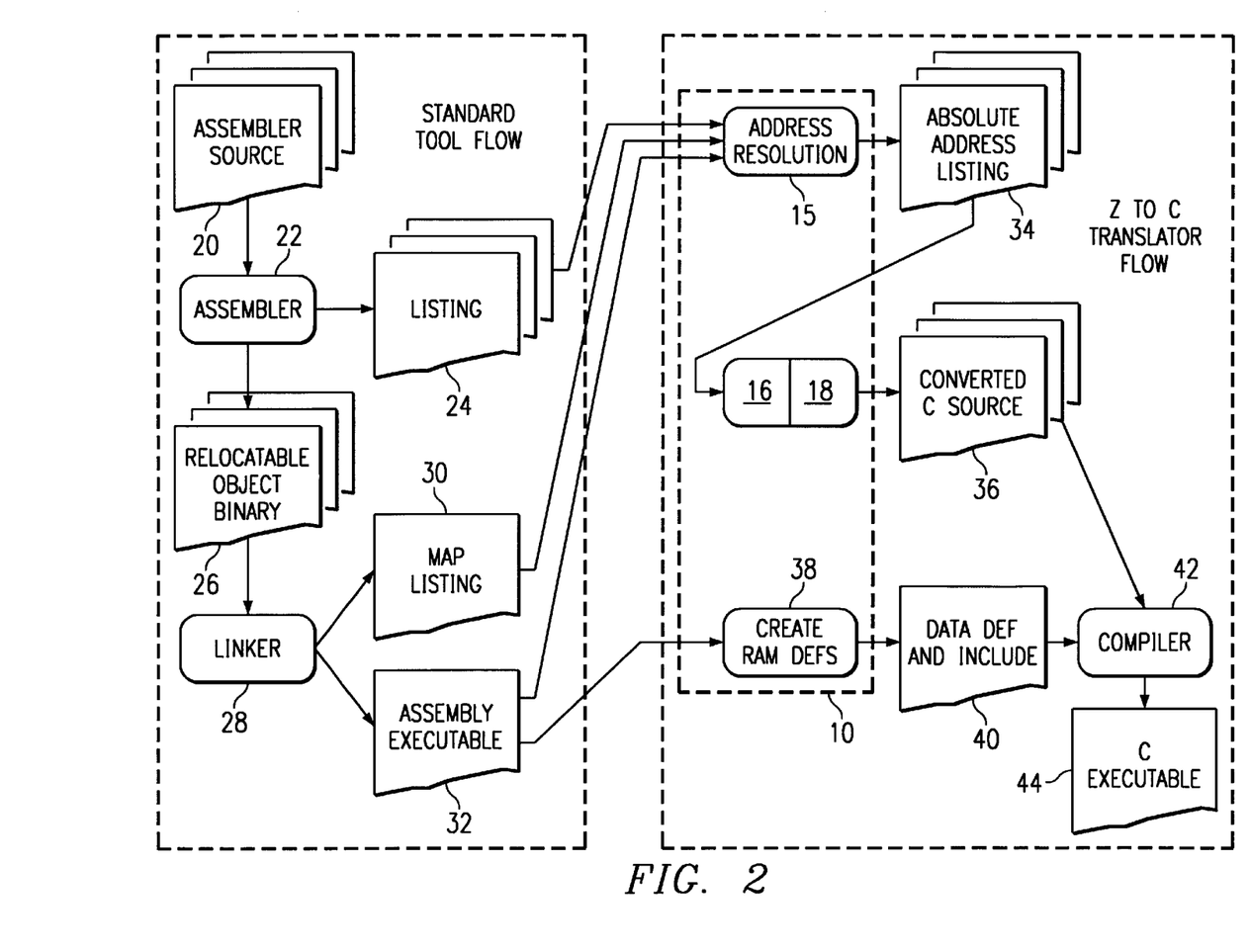
FIG. 2 is a more detailed block diagram of an embodiment of the translator of the present invention.

FIG. 2 is a more detailed block diagram of an embodiment of the present invention. Assembler source code files 20 are what the computer programmers or software engineers have generated. Source files 20 are then supplied to an assembler program 22, which assembles the code and generates two types of output files, listing files 24 and ROB (relocatable object binary) files 26. Source files 20 are assumed to be syntactically correct, so as to not generate compile errors. Listing files 24 are in a human readable format and may contain relocatable values or addresses. There are many assembler programs which are capable of performing this function, including the YASM™ assembler program, developed by Unidot of Golden, Colorado. ROB files 26 may be provided to a linker program 28, such as YALL™, developed by Unidot of Golden, Colorado, which then generates a map listing file 30 and an assembly executable file 32. Linker 28 binds all ROB files 26 together so that map listing file 30 and assembly executable file 32 containing variables and their respective absolute memory addresses may be produced. Assembly executable file 32 is in machine code format and map listing file 30 is in a human readable format. Both are assumed to be bug-free and working in the source environment.

Listing files 24, map listing file 30, and assembly executable file 32 are then provided as input to translator 10. Address resolution process 15 receives listing files 24, map listing file 30, and executable file 32, and generates listing files 34 that contain absolute addresses. For example, the following lines are from an exemplary listing file 24:

| 46 | 0044 | 4D05 | 80000000* | | 42 | LD | BUFF+0, #0 |
|---|---|---|---|---|---|---|---|
| 47 | 004A | 0000 | | | | | |

In Z8000 assembly language, opcodes are represented in four hexadecimal digits. The opcode "4D05" indicates the load or LD instruction with an immediate value and direct addressing mode. The asterisk "*" denotes or flags the "80000000" value for "BUFF" as a relocatable value which requires resolution. The following are the same lines from an exemplary absolute address listing file 34:

```
0500027c  4D05  8500097A  46  0044  4D05  80000000*  42  LD  BUFF+0, #0
05000282  0000            47  004A  0000
```

It may be seen that the relocatable value has been determined to have the absolute value of "8500097A" by address resolution process 15, which obtained this information from map listing 30 and assembly executable file 32. Therefore, the instruction including absolute addresses or values is added to the front of each line by address resolution process 15. Assembly executable file 32 is a binary executable file that runs in native mode on a Z8000 system.

Figure 3:
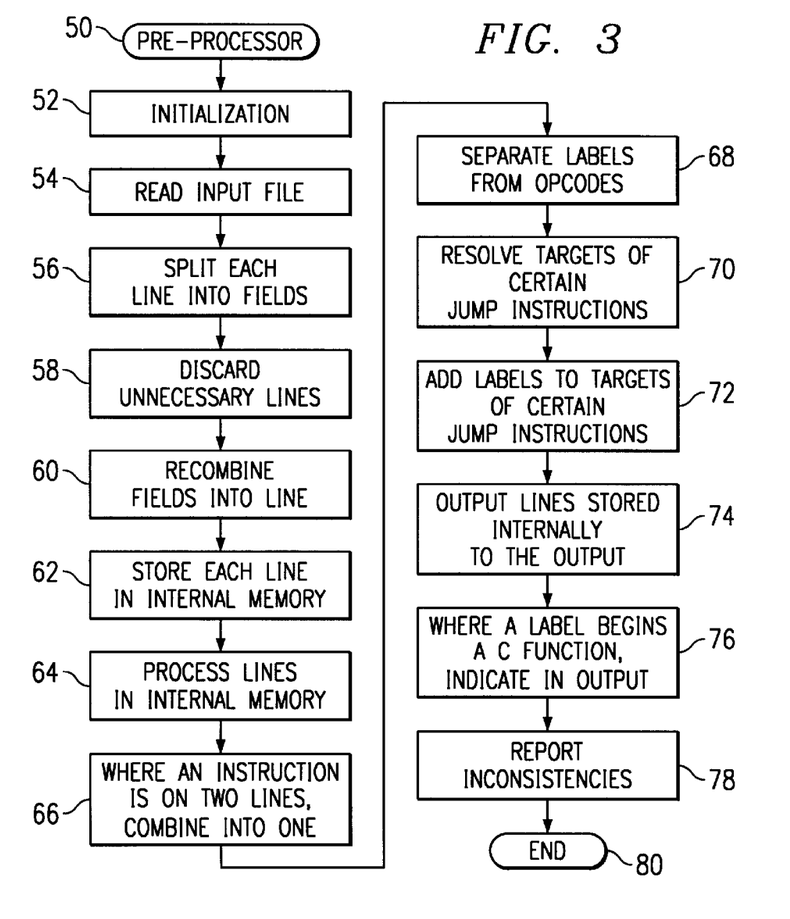
FIG. 3 is a flowchart of an embodiment of a preprocessor process flow of the present invention.

The output of address resolution process 15, absolute address listing files 34, is then provided as input to preprocessor 16. Preprocessor 16 reads each line in absolute address listing files 34 into a data structure in memory, and generally prepares the listing lines for translation by converter 18. Details of preprocessor 16 are shown in FIG. 3 and described below. The output of preprocessor 16 is fed to converter 18, which performs the task of converting the listing line-by-line to the highlevel language, such as C. The output from converter 18 are converted C source files 36. C source files 36 are the translated program from assembly code. Preferably, C source files include the original assembly code as comments so that it is readily apparent as to which lines of assembly code were converted to the current lines of C code. Typically, C source files 36 have a ".c" file extension.

Another component of translator 10 is a create RAM definitions process 38, which generates a file 40 containing assembly code and data, free memory and stack space definitions from assembly executable 32. The output, C data definition file 40 is the equivalent of assembly executable file 32, but in ASCII format, which is compatible C code. A compiler 42 then takes C source files 36 and data definition file 40 and compiles or transforms the source code into object code stored in a C executable file 44 usually called a.out.

FIG. 3 is a flowchart 50 of preprocessor 16 according to an embodiment of the present invention. Some initialization is first performed, as shown in block 52. Initialization may include opening the input and output files, defining the format for a valid absolute address listing line, defining the fields of a valid absolute address listing line, defining the assembly instructions and the corresponding opcodes, and preparing a data structure for storing the listing lines read into the program. In block 54, the input file or absolute address listing file 34 is read in line-by-line. Each line is then split or parsed into individual fields, as shown in block 56. For example, these fields may include absolute address, absolute data, one or more flags, relative line number, relocatable field, absolute line number, label, opcode, operand, and comment. The absolute data field contains the hexadecimal equivalent of the opcode and one or more operands. An example of an absolute listing line is:

```
05000192  2102  0002  42  015A  2102  0002  130 addr_data: LD r2, #2
```

"05000192" is the absolute address;

"2102 0002" is the absolute data;

"42" is the relative line number;

"015A 2102 0002" is the potentially relocatable data;

"130" is the absolute line number;

"addr_data" is a label;

"LD" is the opcode;

"R2, #2" is the operand. The values of these fields are saved as global variables. All white spaces between the fields in the lines are discarded. Because the absolute address listing lines are in a fixed and known format, the fields can be readily parsed.

Each assembler listing line is further categorized into at least two types, those containing valid assembly instructions and those which do not. The lines of interest are lines that contain a nonblank absolute data field. When the absolute data field is nonblank, the absolute data field contains an opcode and (possibly) operands that need conversion. Therefore, lines containing a blank absolute data field are filtered out or discarded, as shown in block 58. The discarded lines may be preserved in memory but flagged as comment lines.

In blocks 60 and 62, the individual fields are recombined into a line and stored in a data structure in internal memory. An array structure may be used to store the program listing lines. The data structure typically does not physically occupy a contiguous block of memory. The individual listing lines stored in the array may be accessible by an index or one or more pointers, for example. Additionally, a predetermined character, such as "|", may be used to delineate or separate the fields in each line. In this manner, each line may be easily referenced as well as each field within each line. Further, each line may be easily taken apart and reconstituted with a subset of the fields.

Beginning in block 64, each line is further examined and processed. Where an instruction is contained on two successive lines, such as the load (LD) instruction:

```
0500027c  4D05  8500097A  46  0044  4D05  80000000*   42   LD   BUFF+0, #0
05000282  0000            47  004A  0000
``` the second line contains an operand, the value zero (0000), which is to be loaded into the absolute address location 8500097A. After the processing done in block 66, the above two lines become:

```
0500027c  4D05  8500097A  0000  46  0044  4D05  80000000*   42   LD   BUFF+0, #0
```

It may be seen that the operand value is now inserted into the first line. The original two lines may be kept proximately to or immediately before or after the new line but flagged by a special flag so that they are not further processed. The instruction, including the opcode and operand, is now contained on a single line, which facilitates the subsequent conversion process.

In block 68, labels are separated from opcodes and put into two different lines. For example, the original line may contain both the opcode and a symbolic label:

```
05000192  2102  0002  42   015A  2102  0002  130  addr_data: LD  r2, #2
```

The resultant lines may be:

```
05000192                 42   015A  2102  0002  130   addr_data
05000192  2102  0002     42   015A  2102  0002  130              LD  r2, #2
```

This process is carried out because the label may indicate the beginning of a section of code (a function) that is separate from the instruction line that it originally resided in. Therefore, the instruction and the label should be separated into two different lines and processed independently of one another.

Next, the preprocessor resolves targets of certain jump instructions, as shown in block 70. This step is necessary because the assembler may generate strange and non-unique labels, particularly within expansion of certain macros. Jump instructions may include JP (jump) and JR (jump relative) instructions. For a JP instruction, the jump address is given in the original line. Therefore, the original line is copied and the jump absolute address is inserted in a field, such as an operand, for example. One or more characters may be added to the absolute address operand to form a symbolic address. For example, the letters "AH_" may be added to the beginning of the absolute jump address. The absolute target is further stored. The absolute target address may be stored in an array, desired_absolute$_{13}$ hex$_{13}$ values, which may be indexed by the jump target address. The original line is then deleted or maintained and flagged as a comment line. In block 72, during a second pass of the listing lines, the absolute address for each valid line is compared with the value stored in the array. If there is a match, then the symbolic label "AH_XXXXXXXX:", where "XXXXXXXX" is the absolute address, is inserted immediately before the line at this absolute address. The corresponding absolute address value stored in the desired_absolute_hex_values array is then deleted.

For a JR instruction, a given operand is the value of the displacement or offset to the intended jump target. Therefore, the absolute address of the target may be easily determined and stored in a desired_relative$_{13}$ hex_values array, for example. The original line is deleted or maintained and flagged as a comment line. In block 72, during a second pass of the listing lines, the absolute address for each valid line is compared with the value stored in the array. If there is a match, then the symbolic label "RH_XXXXXXXX:", where "XXXXXXXX" is the absolute address, is inserted immediately before the line at this absolute address. The corresponding absolute address value stored in the desired_relative_hex_values array is then deleted.

Finally in block 74, the resultant listing lines stored in the data structure are provided as output. At the same time each line is provided as output, where a label on a line begins a C function, this is so indicated in the output. These labels may be special comments of a known format in the origination source listing which begins a function or procedure. A special flag or comment of a known format may be inserted into the line to indicate these starting points.

In block 78, any inconsistencies are either flagged or reported. One item that this process checks may be that there should be at least one procedure or function. Another error condition is that each function should end with either a RET (return), JP, or JR, and that there be at least one RET within the body of the function. This ensures that there is a valid return from each function. Another error condition checked by the process includes examining the desired_absolute_hex_values and the desired_relative_hex_values arrays to ensure that both are empty. This ensures that labels for jump targets have been properly inserted for all jump instructions. The preprocessor ends in block 80.

Figure 4:
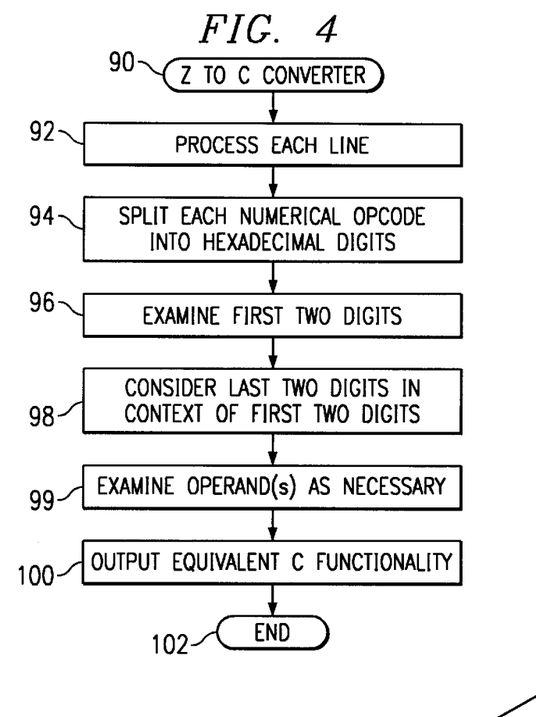
FIG. 4 is a flowchart of an embodiment of a converter process flow of the present invention.

After preprocessing, the conversion process begins. An embodiment of the conversion process 90 is shown in FIG. 4. Converter 18 receives, as input, the output from preprocessor 16, and examines and processes each line, as shown in block 92. For each line, the absolute data field indicative of the opcode, operand, and mode of operation is split into four hexadecimal digits, as shown in block 94. The first digit is examined and then the second, as shown in block 96. The values of the last two digits are then considered in the context of the first two digits, as shown in block 98. This process is similar to using a decision tree, where the value of the first digit causes a branching to a number of branches, the value of the second digits causes further branching in those branches, and so on. The equivalent C functionality is then determined and provided as output, as shown in block 100. The process ends in block 102.

Figure 5:
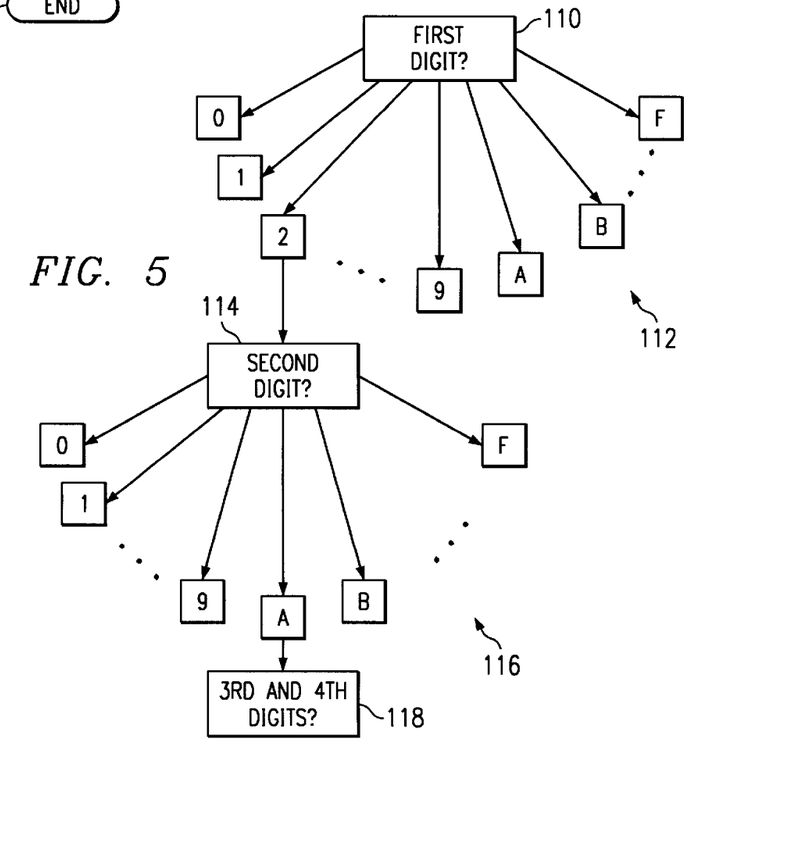
FIG. 5 is a more detailed block diagram of an embodiment of a converter process flow of the present invention.

Referring to FIG. 5, a block diagram illustrating this process is shown. The first hexadecimal digit is examined to determine what it is, as shown in block 110. The first digit value 112 may range from 0–F. Depending upon what the first digit value is, the second hexadecimal digit is then examined to determine its value, as shown in block 114. The second digit value 116 may also range from 0–F. Upon determination of the first and second digit hexadecimal values, then a determination of the third and fourth digit values is made, as shown in block 118. In many cases, the fourth digit specifies a particular register on which the first three digits of the opcode perform a particular operation. For example, the opcode "0004" is "ADDB RH4, . . . " with immediate source addressing mode, which adds the immediate value specified in the operand to the value in byte register number 4.

Alternatively, symbolic opcode decoding or a combination of decoding the numeric opcode and the symbolic opcode may be used to determine what the assembly instruction is. Numeric opcode and operand decoding alone produces accurate equivalent C code that is portable to different platforms. However, such code may not be human readable or maintainable. Therefore, when the only goal is to convert assembly code to portable C code, numeric decoding is all that is required to produce accurate equivalent C functionality. On the other hand, if human intervention after conversion is desirable, such as to maintain the C code, symbolic opcode and operand decoding may be necessary to enhance the human readability of the converted C code.

Figure 6:
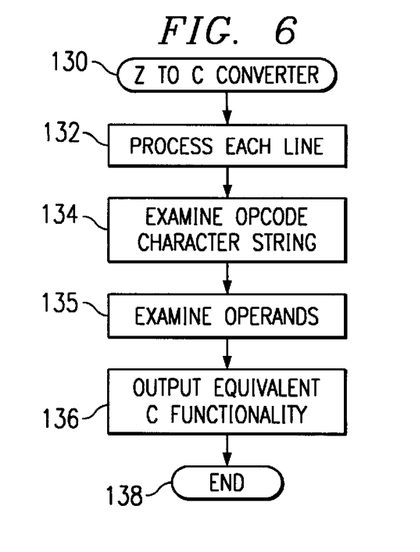
FIG. 6 is a flowchart of an embodiment of the converter process flow of the present invention.

Therefore, instead of or along with parsing the numeric opcode and operand, the symbolic opcode and operand are parsed and examined. Referring to FIG. 6, another embodiment of a Z to C converter process 130 is shown. Each line is examined and processed, as shown in block 132. The opcode character string is examined to determine the assembly instruction specified in each line, as shown in block 134. In general, the opcode is a two to four character string. Upon determining the opcode, the operands are examined, as shown in block 135. Depending on the value of the opcode character string, there may be one or two operands. Typically, if there is only one operand, that operand is either the source or destination. If there are two operands, the format is typically the destination operand followed by the source operand, with a comma separating the two operands. In block 136, the equivalent C functionality is then determined. The following examples provide a discussion of both decoding methods.

For example in implementation, a series of if-then-else statements conditioned on the value of the first numeric digit or one or more opcode characters or a character string may be used to branch execution into a number of code sections, such as subroutines or procedures. In each code section, another series of if-then-else statements conditioned on the value of the second digit or subsequent opcode and operand characters may be used to further differentiate the groups of opcodes. Alternatively, multiple branch instructions, such as a CASE statement, may be used to conditionally branch execution based on the values of the opcode digits and characters.

As discussed above, the values of the first two hexadecimal opcode digits may be used to quickly narrow down the set of possible assembler instructions. In a preferred embodiment, associative arrays may be used to further facilitate this translation process. For example, an associative array may be defined in perl script in this manner:

```
%RX=(
'0',   'R0',
'1',   'R1',
'2',   'R2',
'3',   'R3',
 . . .
'A',   'R10',
 . . .
'F',   'R15');
```

An exemplary listing line with the numeric opcode "0105" and symbolic opcode ADD R5,#6, such as:

| 46 | 015C | 0105 | 0006 | 153 | ADD | R5, #6 | may be translated using the associative array definition above by the following exemplary perl script in the subroutine executed when the first hexadecimal opcode digit is a "0":

if ($second_hex_digit eq '1'){
  if ($third_hex_digit eq '0'){
   print "$RX{$fourth_$_{hex\_digit}=add$_word hex_digit},
",
 "0x$hex_operands[0]);\n";}

Therefore the resultant C code from numeric opcode decoding may be:

R5=add_word(R5, 0x0006);

where "add_word()" is a macro that may be expanded by a C preprocessor. Alternatively, a library of run time C functions may be provided for execution with the converted C program. These C functions in the run time library simulate the functionality of certain known assembler instructions or chunks of code, such as the add_word() function to perform the instruction ADD.

When symbolic decoding is performed, the character string "ADD R5,#6" is examined and parsed. It is determined that the instruction is ADD, and that the operands indicate that the operation is to be performed on register 5, or R5, involving the immediate value, 6. So the resultant C code may be:

R5=R5+6;

or taking advantage of C syntax:

R5+=6;

As an additional example, consider the following line:

05000288|2142    |   |54|0050 2142    |   |50|    |LD    |R2,@RR4    |

The first two digits "21" in the numeric opcode show that this is a LD (load register) instruction with indirect register addressing mode. The third digit "4" means source register 4 (RR4) and the final fourth digit "2" means destination register 2 (R2). Within the Z8000 processor, register RR4 (32 bits) is a concatenation of registers R4 and R5 (each 16 bits). In segmented mode, RR4 contains a 32 bit address. The most significant byte in R4 contains the segment number, and R5 contains the offset within that segment. When converted to C after numeric opcode decoding the following two lines are printed:

/* 05000288|2142    |   |54|0050 2142    |   |50|    |LD |R2,@RR4 | */
R2 = MEMWS (SEG_BYTE4, R5);

The first line is the assembler listing line, which becomes simply a comment in the C code produced. The second line is the actual C code that ultimately will be compiled and executed on the target machine. Each part of this line of C code is described as follows:

R2: the destination register.

MEMWS : this is a macro for "memory word segmented".

SEG_BYTE4 : the first of two arguments to the above macro.

This is the byte within R4 containing the segment number.

R5: the offset within the source segment. Therefore, the entire line of C code means "load into R2 the 16-bit value in the segment specified by SEG_BYTE4, with offset in R5". In fact, each of the above items is a macro. After expansion by the C preprocessor the above line of code becomes:

(reg.words[2])=(*((unsigned short *)(&(((unsigned char *)(seg_ptr[(((*((unsigned char *)(&(reg.longs[2]))))&0x7f))&0x7f]))[((reg.words[5])) &0xfffe]))));

However, by using symbolic decoding to achieve a more natural way to express this functionality, the output in C is:

R2=*((short*)RR4);

In this form of expression, the value in RR4 is a 32-bit address in a linear addressing space. While accurate, this example illustrates that in order to achieve human maintainable C code, the concept of segmentation is lost in the conversion process.

Consider the following line:

050007c8|4C05 85000ECB 55 55||45|0590 4C05
80000005*||428||LDB |BUFF+5,#%55|

The opcode "4C05" shows that this is a LDB (load byte) instruction with direct addressing mode and an immediate value. The first operand "85000ECB" is an absolute segmented address. The second operand "55" is the immediate value (written as "#%55" in the instruction). The third operand (the second "55") is ignored.

The segmented address is split as "85 00 0ECB". The first two digits, "85", represent segment number 5. Because the most significant bit is set, this represents a long form (32 bit) segmented address. A short form (16 bit) segmented address would be "05CB". The "00" is ignored. The "0ECB" is the offset within the segment. When converted to C, the following two lines are generated:

/*0500073c|4C05 85000ECB 55 55||3|0504 4C05 80000005*
||393||LDB|BUFF+5,#%55|*/ MEMBS(0x85 & 0x7f, 0x0ECB)=
0x55;

The second of the above two lines is the actual C code that ultimately will be compiled and executed on the target machine. Each part of this line of C code is described as follows:

MEMBS : this is a macro for "memory byte segmented".

0x85 & 0x7f : the first of two arguments to the above macro.

This is resolved by the compiler to "5", meaning segment 5.

0x0ECB : the offset within the target segment.

This line of C code means "load the value 0x55 into memory location segment 5, offset 0x0ECB."

After expansion by the C preprocessor the above line of code becomes:

(((unsigned char*)(seg_ptr[(0x85&0x7f)&0x7f]))[(unsigned short)
(0x0ECB)])=0x55;

Using symbolic opcode decoding, the "BUFF+5" is the destination operand, which can be written as "BUFF[5]". The conversion process infers that the address of BUFF in the Z8000 is segment 5, offset 0x0EC6. Therefore, this may be written as: BUFF[5]=0x55; while accurate, this conversion process also does away with the concept of segmentation and BUFF becomes an address within a 32-bit linear addressing space.

For a final example consider the following line:

0500042c|5C31 020B 8500097F||53|01F4 5C31 020B||107|||LDM
|R2,BUFF+5(R3),#12|

The first, second and fourth digits, "5C_1", in the opcode show that this is a LDM (load multiple) instruction with indexed addressing mode and an immediate value representing the number of registers to be moved. The third digit in the numeric opcode, "3", is the source index register R3. The first operand is a four nibble value "020B". The "2" in the operand represents the destination register R2. The digit "B" (decimal 11) represents the count and is one less than the immediate value supplied (12 written as #12). The second operand is a 32 bit segmented address similar in format to the segmented address described above.

The segmented address is split as "85 00 097F". The first two digits, "85", represent segment number 5. Because the most significant bit is set, this represents a long form (32 bit) segmented address. The "00" is ignored. The "097F" is the offset within the segment. When converted to C, the following two lines are printed:

/*0500042c|5C31 020B 8500097F||53|01F4 5C31
020B||107|||LDM|R2,BUFF+5(R3),#12|*/LDMXS(R2, 0x85 &
0x7f, 0x097F, R3, 11) ;

The second of the above two lines is the actual C code that ultimately will be compiled and executed on the target machine. This C code means "load 12 registers beginning with R2 from memory location segment 5, offset 0x097F, indexed by R3". Each part of this line of C code is described as follows:

LDMXS : this is a macro for "load multiple indexed segmented".

R2: the destination register R2.

0x85 & 0x7f : the second of five arguments to the above macro.

This is resolved by the compiler to '5', meaning the segment number 5.

0x097F : the offset within the source segment.

R3: the source index register.

11: (the count−1).

After expansion by the C preprocessor the above line of code may become:

```
{
    unsigned int dst = (unsigned char *)&(reg.words[2]) − (unsigned char *)&(reg.words[0]);
    unsigned int count = 11 + 1;
    unsigned int src = (0x097F + (reg.words[3]) );
    for(;count ; count--){
        *((unsigned short *)®.chars[dst]) = (*((unsigned short *)(&(((unsigned char *)(seg_ptr[(0x85 & 0x7f) & 0x7f]))[(src) & 0xfffe])));
        dst += 2;
        dst &= 0x1e;
        src += 2;
    }
};
```

A more natural way to express the above C code is:

LDMX(R2, BUFF[5], R3 , 12);

Note that LDMXS becomes LDMX because the symbolic opcode conversion also does away with segmentation. "BUFF" becomes one address within a 32-bit linear addressing space. What is not immediately apparent is that this code may not produce the correct functionality in the target environment. Because "BUFF" is a linear address within a linear addressing space, the concept of segmentation does not exist. There is no indication in the above code whether it is important to consider wraparound within the segment, or whether R3 should be considered signed or unsigned. In this situation, numeric opcode decoding is required to produce accurate code, or this line of code should be flagged for human intervention after conversion.

It may be seen numeric opcode decoding is necessary in certain situations. Therefore, a combination of symbolic and numeric opcode decoding may be necessary to produce accurate human-readable and maintainable code.

Accordingly, each valid line that contains an assembler instruction is processed and translated in this manner. The final output may include the absolute listing lines as comments, the C equivalent sections of code for each instruction line, and comments that were part of the original assembler program. To make the resultant C program easier to read, certain comment lines and extraneous text may be deleted from the final output. Although specific examples were given in Z8000 assembler language and C, the methodology of the present invention may be adapted to most, if not all, assembler languages and high-level computer languages.

It may be noted that the delineation between the preprocessor process and the conversion process is merely artificial and serves to better highlight the functional aspects of the processes. The two processes may be easily merged into one seamless process which performs multiple passes over the listing lines stored in a data structure in internal memory.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A computer-implemented method of translating an assembler program into a high-level language computer program, comprising:

receiving each line of the assembler program;

parsing each assembler program line into a plurality of individual fields, the plurality of individual fields including an absolute line number and an opcode for an assembler instruction;

storing each assembler program line into a data structure such that each line is accessible and each field in each line is accessible;

selecting one or both of numeric opcode and symbolic opcode parsing;

examining the opcode of each assembler program line according to the selected parsing;

for each assembler program line, traversing a decision tree in response to value of opcode to identify the corresponding assembler instruction;

translating the assembler instruction to an equivalent set of code in the high-level computer language; and outputting the equivalent set of code for each assembler program line.

2. The method, as set forth in claim 1, wherein opcode examining comprises parsing a numeric opcode of each assembler program line into individual digits.

3. The method, as set forth in claim 1, wherein opcode examining comprises:

examining a symbolic opcode; and examining one or two symbolic operands.

4. The method, as set forth in claim 1, further comprising:

resolving a target address for a jump opcode; and inserting a unique target label at the target address.

5. The method, as set forth in claim 1, further comprising identifying a label indicative of the start of a function.

6. The method, as set forth in claim 1, further comprising:

identifying an assembler instruction contained on more than one line; and combining data contained in the more than one line of the assembler instruction into one line.

7. The method, as set forth in claim 6, further comprising discarding certain repetitive data contained in the more than one line of the assembler instruction.

8. The method, as set forth in claim 1, further comprising:

identifying an assembler program line containing an opcode and a label; and generating a first assembler program line containing the label and a second assembler program line containing the opcode.

9. The method, as set forth in claim 1, further comprising:

discarding space characters and other extraneous characters after the parsing step; and recombining the parsed fields of each assembler program line into an assembler program line.

10. The method, as set forth in claim 1, further comprising inserting the equivalent set of code into the data structure proximately to the assembler program line.

11. The method, as set forth in claim 1, further comprising:

receiving a listing generated by an assembler;

receiving a map listing and an assembly executable file from a linker; and adding the absolute address of a listing line contained in the map listing to each listing line.

12. The method, as set forth in claim 1, further comprising:
receiving a listing generated by an assembler;
receiving a map listing and an assembly executable file from a linker; and
adding the absolute value of a relocatable operand contained in the map listing to each listing line.

13. The method, as set forth in claim 1, further comprising creating RAM definitions of data definitions and included data.

14. The method, as set forth in claim 1, wherein the storing step includes storing the assembler program lines into an array.

15. The method, as set forth in claim 1, wherein the decision traversing step comprises:
for each assembler program line:
determining the value of a first opcode digit;
determining the value of a second opcode digit
in response to the value of the first opcode digit;
determining the value of a third opcode digit in response to the values of the first and second opcode digits; and
determining the value of a fourth opcode digit and therefore the assembler instruction in response to the values of the first, second and third opcode digits.

16. The method, as set forth in claim 1, further comprising:
noting all function entry points and exit points; and
flagging any inconsistencies in the number of entry points and exit points.

17. A computer-implemented method of translating an assembler program into a high-level language computer program, comprising:
receiving each line of the assembler program;
parsing individual fields in each assembler program line, including an absolute line number and a numeric opcode for an assembler instruction;
storing each assembler program line into a data structure such that each line is accessible and each field in each line is accessible;
parsing the numeric opcode of each assembler program line into individual digits;
for each assembler program line:
determining the value of a first numeric opcode digit;
determining the value of a second numeric opcode digit in response to the value of the first numeric opcode digit;
determining the value of a third numeric opcode digit in response to the values of the first and second numeric opcode digits;
determining the value of a fourth numeric opcode digit and therefore the assembler instruction in response to the values of the first, second and third numeric opcode digits; and
translating the assembler instruction to an equivalent set of code in the high-level computer language;
outputting the equivalent set of code for each assembler program line.

18. The method, as set forth in claim 17, further comprising:
resolving a target address for a jump opcode; and
inserting a unique target label at the target address.

19. The method, as set forth in claim 17, further comprising identifying a label indicative of the start of a function.

20. The method, as set forth in claim 17, further comprising:
identifying an assembler instruction contained on more than one line; and
combining data contained in the more than one line of the assembler instruction into one line.

21. The method, as set forth in claim 20, further comprising discarding certain repetitive data contained in the more than one line of the assembler instruction.

22. The method, as set forth in claim 17, further comprising:
identifying an assembler program line containing an opcode and a label; and
generating a first assembler program line containing the label and a second assembler program line containing the opcode.

23. The method, as set forth in claim 17, further comprising:
discarding space characters and other extraneous characters after the parsing step; and
recombining the parsed fields of each assembler program line into an assembler program line.

24. The method, as set forth in claim 17, further comprising inserting the equivalent set of code into the data structure proximately to the assembler program line.

25. The method, as set forth in claim 17, further comprising:
receiving a listing generated by an assembler;
receiving a map listing and an assembly executable file from a linker; and
adding the absolute address of a listing line contained in the map listing to each listing line.

26. The method, as set forth in claim 17, further comprising:
receiving a listing generated by an assembler;
receiving a map listing and an assembly executable file from a linker; and
adding the absolute value of a relocatable operand contained in the map listing to each listing line.

27. The method, as set forth in claim 17, further comprising creating RAM definitions of data definitions and included data.

28. The method, as set forth in claim 17, wherein the storing step includes storing the assembler program lines into an array.

29. A computer-implemented method of translating an assembler program into a high-level language computer program, comprising:
receiving each line of the assembler program;
parsing individual fields in each assembler program line, including an absolute line number and a symbolic opcode and at least one operand for an assembler instruction;
storing each assembler program line into a data structure such that each line is accessible and each field in each line is accessible;
selecting one or both of numeric opcode and symbolic opcode parsing;
examining the symbolic opcode and determining the opcode instruction according to the selected parsing;
examine at least one operand; and
translating the assembler instruction to an equivalent set of code in the high-level computer language.

30. The method, as set forth in claim 29, further comprising:

resolving a target address for a jump opcode; and inserting a unique target label at the target address.

31. The method, as set forth in claim 29, further comprising identifying a label indicative of the start of a function.

32. The method, as set forth in claim 29, further comprising:

identifying an assembler instruction contained on more than one line; and combining data contained in the more than one line of the assembler instruction into one line.

33. The method, as set forth in claim 32, further comprising discarding certain repetitive data contained in the more than one line of the assembler instruction.

34. The method, as set forth in claim 29, further comprising:

identifying an assembler program line containing an opcode and a label; and generating a first assembler program line containing the label and a second assembler program line containing the opcode.

35. The method, as set forth in claim 29, further comprising:

discarding space characters and other extraneous characters after the parsing step; and recombining the parsed fields of each assembler program line into an assembler program line.

36. The method, as set forth in claim 29, further comprising inserting the equivalent set of code into the data structure proximately to the assembler program line.

37. The method, as set forth in claim 29, further comprising:

receiving a listing generated by an assembler;

receiving a map listing and an assembly executable file from a linker; and adding the absolute address of a listing line contained in the map listing to each listing line.

38. The method, as set forth in claim 29, further comprising:

receiving a listing generated by an assembler;

receiving a map listing and an assembly executable file from a linker; and adding the absolute value of a relocatable operand contained in the map listing to each listing line.

39. The method, as set forth in claim 29, further comprising creating RAM definitions of data definitions and include data.

40. The method, as set forth in claim 29, wherein the storing step includes storing the assembler program lines into an array.

* * * * *